United States Patent
Bai et al.

(10) Patent No.: US 10,407,608 B2
(45) Date of Patent: Sep. 10, 2019

(54) STRONG PLUGGING DRILLING FLUID SUITABLE FOR SHALE GAS WELLS AND PREPARATION METHOD THEREOF

(71) Applicant: Southwest Petroleum University, Chengdu (CN)

(72) Inventors: Yang Bai, Chengdu (CN); Pingya Luo, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 15/952,917

(22) Filed: Apr. 13, 2018

(65) Prior Publication Data
US 2019/0241791 A1    Aug. 8, 2019

Related U.S. Application Data

(63) Continuation of application No. PCT/CN2018/075985, filed on Feb. 9, 2018.

(30) Foreign Application Priority Data

Feb. 7, 2018   (CN) .......................... 2018 1 0122623

(51) Int. Cl.
*C09K 8/48* (2006.01)
*C09K 8/20* (2006.01)

(52) U.S. Cl.
CPC .............. *C09K 8/48* (2013.01); *C09K 8/203* (2013.01); *C09K 8/206* (2013.01); *C09K 2208/10* (2013.01)

(58) Field of Classification Search
None
See application file for complete search history.

(56) References Cited

U.S. PATENT DOCUMENTS

| 2,923,681 A * | 2/1960 | Hein .................. C09K 8/12 507/106 |
| 5,439,056 A * | 8/1995 | Cowan ................ C04B 28/021 106/790 |
| 2015/0027699 A1* | 1/2015 | Loiseau .................. C09K 8/92 166/278 |

FOREIGN PATENT DOCUMENTS

CN       107446559       * 12/2017

* cited by examiner

*Primary Examiner* — Jeffrey D Washville
(74) *Attorney, Agent, or Firm* — Calfee, Halter & Griswold LLP

(57) ABSTRACT

The present invention relates to the field of drilling fluids, and discloses a strong plugging drilling fluid suitable for shale gas wells and a preparation method of the drilling fluid. The drilling fluid contains water, bentonite, a tackifier, a flow pattern regulator, a filtrate reducer, a plugging agent, and a weighting agent, wherein, based on 100 parts by weight of water, the content of the bentonite is 1-10 parts by weight, the content of the tackifier is 5-15 parts by weight, the content of the flow pattern regulator is 4-13 parts by weight, the content of the filtrate reducer is 4-13 parts by weight, the content of the plugging agent is 20-55 parts by weight, and the content of the weighting agent is 10-60 parts by weight; the drilling fluid provided in the present invention employs modified nano-silica as a plugging agent to improve dispersity and particle size distribution in the drilling fluid system. Therefore, the drilling fluid is especially suitable for well drilling in shale formations with developed micro-fractures (micro-fissures) and micro-pores, low porosity and low permeability ($10^{-3}$-$10^{-7}$ md), and prominent capillary effect.

6 Claims, No Drawings

STRONG PLUGGING DRILLING FLUID SUITABLE FOR SHALE GAS WELLS AND PREPARATION METHOD THEREOF

CROSS-REFERENCE TO RELATED APPLICATIONS

This application is a continuation of International Application No. PCT/CN2018/075985, filed on Feb. 9, 2018, which claims priority to and benefits of Chinese Patent Application Serial No. 201810122623.4, filed with the State Intellectual Property Office of P. R. China on Feb. 7, 2018, the entire contents of which are incorporated herein by reference.

FIELD OF THE INVENTION

The present invention relates to the field of drilling fluids, in particular to a strong plugging drilling fluid suitable for shale gas wells and a preparation method of the drilling fluid.

BACKGROUND OF THE INVENTION

A key to shale gas well drilling is wall stability of the shale well section, wherein, the core problems are how to decrease caving pressure, how to ensure well wall stability, form a well bore in a good shape, and ensure downhole safety with a low-density drilling fluid.

Low-cost water-based drilling fluids may be used for drilling shale gas wells in view that oil-based drilling fluids are not ideal. If the above-mentioned problems can be solved with water-based drilling fluid techniques, a technical gap in this domain in China and foreign countries can be filled up.

The primary task for drilling a shale gas well with water-based drilling fluid techniques is to ascertain the caving pressure in the shale well section and evaluate increased caving pressure incurred by a water-based drilling fluid, including the effect of hydration on well wall stability and caving pressure; then, appropriate drilling fluid density shall be selected to improve plugging and inhibition effects, and the type of water-based drilling fluid shall be selected correctly; finally, a low-density water-based drilling fluid may be used to ensure well wall stability, form a well bore in a good shape, and ensure downhole safety.

Drilling fluid theories and techniques related with wall instability of mud shale wells have been developed and improved substantively, and some of them have been gradually consummated and applied successfully in the field, and have achieved remarkable economic and social benefits. Some theories and relevant techniques provide direct support for study on wall stability of shale gas wells. However, in view of the particularities of shale formations, such as weak expansion and strong dispersion, developed micro-fractures (micro-fissures) and micro-pores, low porosity and low permeability ($10^{-3}$-$10^{-7}$ md), prominent capillary effect, severe rock fall and caving, etc., relevant theories, techniques, and evaluation methods must be further improved, such as mechanical and chemical coupling problem, micro-fracture and micro-fissure plugging evaluation method and criteria, determination of calculation method for caving pressure of horizontal shale well formation according to the well track and formation stress condition, and quantitative relation between inhibition performance of drilling fluid and increased caving pressure of formation, etc.

Therefore, if those technical problems can be effectively solved with water-based drilling fluid techniques, a technical gap in the domain in China and foreign countries will be filled up, and a solid foundation can be set for engineering institutions to carry out safe shale gas well drilling and effective exploitation in the future.

SUMMARY OF THE INVENTION

In view that the existing theories and techniques related with water-based drilling fluids can't solve the problems related with shale formations, including developed micro-fractures (micro-fissures) and micro-pores, low porosity and permeability ($10^{-3}$-$10^{-7}$ md), and prominent capillary effect, etc., the present invention provides a strong plugging drilling fluid suitable for shale gas wells and a preparation method of the drilling fluid, in order to solve the above problems in the prior art.

To attain the object described above, in one aspect, the present invention provides a strong plugging drilling fluid suitable for shale gas wells. The drilling fluid contains water, bentonite, a tackifier, a flow pattern regulator, a filtrate reducer, a plugging agent, and a weighting agent, and, based on 100 parts by weight of water, the content of the bentonite is 1-10 parts by weight, the content of the tackifier is 5-15 parts by weight, the content of the flow pattern regulator is 4-13 parts by weight, the content of the filtrate reducer is 4-13 parts by weight, the content of the plugging agent is 20-55 parts by weight, and the content of the weighting agent is 10-60 parts by weight.

In another aspect, the present invention provides a method for preparing the drilling fluid suitable for shale gas wells, which comprises the following steps:
(1) prehydrating bentonite;
(2) mixing the prehydrated bentonite obtained in the step (1) with modified nano-silica;
(3) mixing the mixture obtained in the step (2) with a tackifier, a flow pattern regulator, a filtrate reducer, and a weighting agent.

With the technical scheme described above, the drilling fluid provided in the present invention employs modified nano-silica to improve dispersity and particle size distribution in the drilling fluid. Therefore, the drilling fluid is especially suitable for well drilling in shale formations with developed micro-fractures (micro-fissures) and micro-pores, low porosity and low permeability ($10^{-3}$-$10^{-7}$ md), and prominent capillary effect, and attains a strong plugging effect.

DETAILED DESCRIPTION OF THE EMBODIMENTS

Hereunder some embodiments of the present invention will be detailed. It should be understood that the embodiments described here are only provided to describe and explain the present invention, but shall not be deemed as constituting any limitation to the present invention.

To attain the object of the present invention, in one aspect, the present invention provides a strong plugging drilling fluid suitable for shale gas wells. The drilling fluid contains water, bentonite, a tackifier, a flow pattern regulator, a filtrate reducer, a plugging agent, and a weighting agent, and, based on 100 parts by weight of water, the content of the bentonite may be 1-10 parts by weight, the content of the tackifier may be 5-15 parts by weight, the content of the flow pattern regulator may be 4-13 parts by weight, the content of the filtrate reducer may be 4-13 parts by weight, the content of the plugging agent may be 20-55 parts by weight, and the content of the weighting agent may be 10-60 parts by weight.

In the present invention, to make the drilling fluid more suitable for well drilling in shale formations with developed micro-fractures (micro-fissures) and micro-pores, low porosity and low permeability ($10^{-3}$-$10^{-7}$ md), and prominent capillary effect, preferably, based on 100 parts by weight of water, the content of the bentonite is 5-7 parts by weight, the content of the tackifier is 9-11 parts by weight, the content of the flow pattern regulator is 9-11 parts by weight, the content of the filtrate reducer is 9-11 parts by weight, the content of the plugging agent is 44-46 parts by weight, and the content of the weighting agent is 35-45 parts by weight.

In the drilling fluid according to the present invention, the bentonite may be Xinjiang Xiazijie bentonite from Xinjiang Nonmetallic Minerals Xiazijie Bentonite Co., Ltd.

Wherein, the tackifier may be one or more of xanthan gum, asbestos fiber and/or hydroxyethyl cellulose; to inhibit surface hydration of clay minerals better, preferably, the tackifier is hydroxyethyl cellulose; in the present invention, the xanthan gum may be xanthan gum XC from Henan Yongjia Chemical Products Co., Ltd.; the asbestos fiber may be asbestos fiber SM-1 from Lingshou Pengbo Minerals Processing Plant; the hydroxyethyl cellulose may be hydroxyethyl cellulose HEC from Feicheng Yutian Chemicals Co., Ltd.

Wherein, the flow pattern regulator may be one or more of chromium-free sulfonated lignite, acrylamide and/or sodium acrylate; to inhibit surface hydration of clay minerals better, preferably, the flow pattern regulator is sodium acrylate; in the present invention, the chromium-free sulfonated lignite may be chromium-sulfonated lignite M-SMC from Chengdu Chuanfeng Chemicals Co., Ltd.; the acrylamide may be acrylamide ACM from Chengdu Kelong Chemical Reagent Plant; the sodium acrylate may be sodium acrylate SA from Chengdu Kelong Chemical Reagent Plant.

Wherein, the filtrate reducer may be one or more of sulfomethylated phenolic resin, lignite resin and/or carboxymethyl starch; to inhibit surface hydration of clay minerals better, preferably, the filtrate reducer is lignite resin; in the present invention, the sulfomethylated phenolic resin may be sulfomethylated phenolic resin SMP-2 from Hebei Yanxing Chemicals Co., Ltd.; the lignite resin may be lignite resin SPNH from Chengdu Chuanfeng Chemicals Co., Ltd.; the carboxymethyl starch may be carboxymethyl starch CMS from Hebei Yanxing Chemicals Co., Ltd.

Wherein, the weighting agent may be barite, limestone flour and/or iron ore powder; preferably, the weighting agent is iron ore powder; in the present invention, the barite may be barite BS-1 from Lingshou Yaoxin Minerals Processing Plant; the limestone flour may be from Lingshou Yaoxin Minerals Processing Plant, and the main ingredient of the limestone flour is $CaCO_3$; the iron ore powder may be from Lingshou Yaoxin Minerals Processing Plant, and the main ingredient of the iron ore powder is $Fe_3O_4$.

Wherein, the method for preparing the plugging agent comprises the following steps:
(1) dissolving nano-silica in N-methyl pyrrolidone;
(2) mixing pyrrolidone with a silane coupler;
(3) controlling the mixture obtained in the step (1) and the mixture obtained in the step (2) to have a reaction;
(4) centrifuging the reaction product obtained in the step (3).

The preparation method further comprises drying the nano-silica before dissolving the nano-silica in the N-methyl pyrrolidone; in the present invention, the nano-silica may be in a spherical shape, and may be nano-silica Y200 from Shanghai Yuantai Chemical Products Co., Ltd.

In the preparation method, preferably, the conditions for drying the nano-silica may include: the nano-silica is placed in a vacuum drying oven and dried at 70-98° C. temperature for 18-24 h; more preferably, the nano-silica is dried at 85-95+ C. temperature for 20-22 h.

In the preparation method, the conditions of the dissolution in the step (1) may include: The dried nano-silica is taken out and loaded into a three-neck flask, N-methyl pyrrolidone is added into the three-neck flask, and the mixture is treated by ultrasonic treatment at 25-40° C. temperature at 2-4 MHz ultrasonic frequency for 3-55 min.; preferably, the nano-silica is treated by ultrasonic dispersion at 31-35° C. for 40-50 min. at 3-3.5 MHz ultrasonic frequency.

In the preparation method, the pyrrolidone and the silane coupler are mixed homogeneously in the step (2); preferably, the mixing may be executed under a stirring condition, wherein, there is no particular restriction on the stirring device, and the stirring may be executed at 1,000-2,000 rpm stirring speed, as long as the pyrrolidone and the silane coupler can be mixed homogeneously.

In the preparation method, in the step (3), the mixture obtained in the step (2) is added into the mixture obtained in the step (1), and the resultant mixture is held at 25-40° C. temperature for 250-400 min. for reaction; preferably, the resultant mixture is held at 31-35° C. temperature for 280-320 min. for reaction; the step (3) is preferably executed under inert gas shielding, and the inert gas may be nitrogen or argon, preferably is nitrogen.

In the preparation method, the mixture obtained in the step (3) is centrifuged in the step (4), wherein, the centrifuging device may be a low speed centrifuge; the centrifuging conditions may include: centrifugation at 20-25+ C. temperature at 2,000-3,000 rpm. centrifugation speed for 5-10 min.

The preparation method further comprises precipitation, filtering and drying after the centrifugation; wherein, the precipitation may be executed by holding still the centrifuged mixture for 4-6 h for precipitation; the filtering may be executed by separating solids that are insoluble in the liquid from the liquid with a filter or a piece of filter paper.

Preferably, there is no particular restriction on the drying device. For example, the drying may be carried out in a drying oven, and the drying conditions may include: temperature: 50-80° C., time: 100-120 min.

In the preparation method, in relation to 100 parts by weight of nano-silica, the dose of the N-methyl pyrrolidone is 30-50 parts by weight, the dose of the pyrrolidone is 15-32 parts by weight, and the dose of the silane coupler is 47-61 parts by weight.

In the preparation method, the plugging agent is modified nano-silica; preferably, the modified nano-silica is in a primary mono-dispersed structure; generally speaking, nano-silica may exist in two forms, i.e., mono-dispersed primary particles and agglomerated secondary particles; primary particles are in an excited state, and have very high reactivity; secondary particles are in a relatively stable state. Owing to the fact that a large quantity of hydroxyl radicals exist on the surface of the nano-silica, the surface bonding energy is very high, and the particles tend to agglomerate and form agglomerate structures, i.e., in a state of agglomerated secondary particles. Therefore, in the present invention, the nano-silica is modified so that the modified nano-silica is in a primary particle state, i.e., form primary mono-dispersed structures; in addition, the particle diameter of the modified nano-silica is relatively small.

More preferably, the particle diameter of the modified nano-silica is 25-70 nm; optimally, the particle diameter of the modified nano-silica is 50-60 nm.

Wherein, the plugging agent may be modified nano-silica; in the present invention, the drilling fluid employs modified nano-silica that has the above-mentioned specific structure and specific size distribution range to improve dispersity and particle size distribution in the drilling fluid. Therefore, the drilling fluid is especially suitable for well drilling in shale formations with developed micro-fractures (micro-fissures) and micro-pores, low porosity and low permeability ($10^{-3}$-$10^{-7}$ md), and prominent capillary effect.

In the drilling fluid according to the present invention, the pH of the drilling fluid may be 8-10.

In the drilling fluid according to the present invention, the density of the drilling fluid may be 1.1-1.8 g/cm$^3$; preferably is 1.3-1.5 g/cm$^3$. In the present invention, a low-density drilling fluid is used to decrease caving pressure, ensure well wall stability, form a well bore in a good shape, and ensure downhole safety.

In another aspect, the present invention provides a method for preparing the drilling fluid suitable for shale gas wells, which comprises the following steps:

(1) prehydrating bentonite;
(2) mixing the prehydrated bentonite obtained in the step (1) with modified nano-silica;
(3) mixing the mixture obtained in the step (2) with a tackifier, a flow pattern regulator, a filtrate reducer, and a weighting agent.

The preparation method according to the present invention preferably is executed under a stirring condition, wherein, the stirring speed may be 500-2,500 rpm, preferably is 1,000-2,000 rpm; the mixture can be made more homogenous under the stirring condition.

In the preparation method according to the present invention, the prehydrated bentonite is mixed with the modified nano-silica first, and then the resultant mixture is mixed with the tackifier, flow pattern regulator, filtrate reducer and weighting agent, so that the obtained drilling fluid can attain a better effect when it is applied in shale gas well drilling.

Hereunder the present invention will be detailed in examples.

Preparation Example 1

This preparation example is provided to describe the method for preparing the modified nano-silica.

(1) 50 g nano-silica is weighed and loaded into a vacuum drying oven, and dried at 85° C. temperature for 20 h;
(2) The nano-silica dried in the step (1) is taken out and loaded into a three-neck flask, 22 g N-methyl pyrrolidone is added into the three-neck flask, and the mixture is treated by ultrasonic dispersion at 31° C. temperature for 40 min. at 3 MHz ultrasonic frequency;
(3) 50 g pyrrolidone is mixed with 24 g silane coupler homogeneously;
(4) The mixture obtained in the step (3) is added into the mixture obtained in the step (2), and then nitrogen is charged into the resultant mixture, and the resultant mixture is held at 31° C. temperature for 280 min. for reaction;
(5) The mixture obtained in the step (4) is treated by centrifugation, precipitation, filtering, and dried at 65° C. temperature;

Thus, a modified nano-silica G1 is obtained; and

The modified nano-silica G1 is in a primary mono-dispersed structure, and the average particle diameter is 55 nm.

Preparation Example 2

This preparation example is provided to describe the method for preparing the modified nano-silica.

(1) 60 g nano-silica is weighed and loaded into a vacuum drying oven, and dried at 95° C. temperature for 22 h;
(2) The nano-silica dried in the step (1) is taken out and loaded into a three-neck flask, 24 g N-methyl pyrrolidone is added into the three-neck flask, and the mixture is treated by ultrasonic dispersion at 35° C. temperature for 50 min. at 3.5 MHz ultrasonic frequency;
(3) 60 g pyrrolidone is mixed with 30 g silane coupler homogeneously;
(4) The mixture obtained in the step (3) is added into the mixture obtained in the step (2), and then nitrogen is charged into the resultant mixture, and the resultant mixture is held at 35° C. temperature for 320 min. for reaction;
(5) The mixture obtained in the step (4) is treated by centrifugation, precipitation, filtering, and dried at 65° C. temperature;

Thus, a modified nano-silica G2 is obtained; and

The modified nano-silica G2 is in a primary mono-dispersed structure, and the average particle diameter is 58 nm.

Example 1

This example is provided to describe the strong plugging drilling fluid suitable for shale gas wells and the preparation method of the drilling fluid in the present invention.

(1) 100 parts by weight of tap water is mixed with 6 parts by weight Xinjiang Xiazijie bentonite at 25° C. temperature, and the mixture is stirred at 1,000 rpm stirring speed for 30 min., and then is kept still for 1 day.
(2) The mixture obtained in the step (1) is mixed with 45 g modified nano-silica that is prepared in the preparation example 1 and is in primary mono-dispersed structure with 55 nm average particle diameter at 25° C. temperature, and the resultant mixture is stirred at 2,000 rpm stirring speed for 30 min.
(3) The mixture obtained in the step (2) is mixed with 10 g hydroxyethyl cellulose, 10 g lignite resin, 10 g sodium acrylate, and 40 g iron ore powder at 25° C. temperature, and the resultant mixture is stirred at 2,000 rpm stirring speed for 30 min.

Thus, a drilling fluid S1 as described in the present invention is obtained.

The experimental data of permeable leakage loss of the drilling fluid is shown in Table 1;

The experimental data of fractured leakage loss of the drilling fluid is shown in Table 2.

Example 2

This example is provided to describe the strong plugging drilling fluid suitable for shale gas wells and the preparation method of the drilling fluid in the present invention.

(1) 100 parts by weight of tap water is mixed with 5 parts by weight Xinjiang Xiazijie bentonite at 25° C. temperature, and the mixture is stirred at 1,000 rpm stirring speed for 30 min., and then is kept still for 1 day.

(2) he mixture obtained in the step (1) is mixed with 44 g modified nano-silica that is prepared in the preparation example 1 and is in primary mono-dispersed structure with 55 nm average particle diameter at 25° C. temperature, and the resultant mixture is stirred at 2,000 rpm stirring speed for 30 min.

(3) The mixture obtained in the step (2) is mixed with 9 g hydroxyethyl cellulose, 9 g lignite resin, 9 g sodium acrylate, and 35 g iron ore powder at 25° C. temperature, and the resultant mixture is stirred at 2,000 rpm stirring speed for 30 min.

Thus, a drilling fluid S2 as described in the present invention is obtained.

The experimental data of permeable leakage loss of the drilling fluid is shown in Table 1;

The experimental data of fractured leakage loss of the drilling fluid is shown in Table 2.

Example 3

This example is provided to describe the strong plugging drilling fluid suitable for shale gas wells and the preparation method of the drilling fluid in the present invention.

(1) 100 parts by weight of tap water is mixed with 7 parts by weight Xinjiang Xiazijie bentonite at 25° C. temperature, and the mixture is stirred at 1,000 rpm stirring speed for 30 min., and then is kept still for 1 day.

(2) The mixture obtained in the step (1) is mixed with 46 g modified nano-silica that is prepared in the preparation example 1 and is in primary mono-dispersed structure with 55 nm average particle diameter at 25° C. temperature, and the resultant mixture is stirred at 2,000 rpm stirring speed for 30 min.

(3) The mixture obtained in the step (2) is mixed with 11 g hydroxyethyl cellulose, 11 g lignite resin, 11 g sodium acrylate, and 45 g iron ore powder at 25° C. temperature, and the resultant mixture is stirred at 2,000 rpm stirring speed for 30 min.

Thus, a drilling fluid S3 as described in the present invention is obtained.

The experimental data of permeable leakage loss of the drilling fluid is shown in Table 1;

The experimental data of fractured leakage loss of the drilling fluid is shown in Table 2.

Example 4

A drilling fluid is prepared with the method described in the example 1, but the modified nano-silica is replaced with the modified nano-silica prepared in the preparation example 2.

Thus, a drilling fluid S4 as described in the present invention is obtained.

The experimental data of permeable leakage loss of the drilling fluid is shown in Table 1;

The experimental data of fractured leakage loss of the drilling fluid is shown in Table 2.

Example 5

A drilling fluid is prepared with the method described in the example 2, but the modified nano-silica is replaced with the modified nano-silica prepared in the preparation example 2.

Thus, a drilling fluid S5 as described in the present invention is obtained.

The experimental data of permeable leakage loss of the drilling fluid is shown in Table 1;

The experimental data of fractured leakage loss of the drilling fluid is shown in Table 2.

Example 6

A drilling fluid is prepared with the method described in the example 3, but the modified nano-silica is replaced with the modified nano-silica prepared in the preparation example 2.

Thus, a drilling fluid S6 as described in the present invention is obtained.

The experimental data of permeable leakage loss of the drilling fluid is shown in Table 1;

The experimental data of fractured leakage loss of the drilling fluid is shown in Table 2.

Example 7

A drilling fluid is prepared with the method described in the example 1, but the dose of the bentonite is 1 g, the tackifier is xanthan gum and the dose of it is 5 g, the flow pattern regulator is chromium-free sulfonated lignite and the dose of it is 4 g, the filtrate reducer is sulfomethylated phenolic resin and the dose of it is 4 g, the plugging agent is modified nano-silica and the dose of it is 20 g, and the weighting agent is barite and the dose of it is 10 g.

Thus, a drilling fluid S7 as described in the present invention is obtained.

The experimental data of permeable leakage loss of the drilling fluid is shown in Table 1;

The experimental data of fractured leakage loss of the drilling fluid is shown in Table 2.

Example 8

A drilling fluid is prepared with the method described in the example 1, but the dose of the bentonite is 10 g, the tackifier is asbestos fiber and the dose of it is 15 g, the flow pattern regulator is acrylamide and the dose of it is 13 g, the filtrate reducer is carboxymethyl starch and the dose of it is 13 g, the plugging agent is modified nano-silica and the dose of it is 55 g, and the weighting agent is limestone flour and the dose of it is 10-60 g.

Thus, a drilling fluid S8 as described in the present invention is obtained.

The experimental data of permeable leakage loss of the drilling fluid is shown in Table 1;

The experimental data of fractured leakage loss of the drilling fluid is shown in Table 2.

Example 9

A drilling fluid is prepared with the method described in the example 1, but the dose of the bentonite is 0.9 g, the dose of the modified nano-silica is 19 g, the dose of the hydroxyethyl cellulose is 4 g, the dose of the lignite resin is 3 g, the dose of the sodium acrylate is 3 g, and the dose of the iron ore powder is 9 g.

Thus, a drilling fluid S9 as described in the present invention is obtained.

The experimental data of permeable leakage loss of the drilling fluid is shown in Table 1;

The experimental data of fractured leakage loss of the drilling fluid is shown in Table 2.

Example 10

A drilling fluid is prepared with the method described in the example 1, but the dose of the bentonite is 11 g, the dose of the modified nano-silica is 56 g, the dose of the hydroxyethyl cellulose is 16 g, the dose of the lignite resin is 14 g, the dose of the sodium acrylate is 14 g, and the dose of the iron ore powder is 61 g.

Thus, a drilling fluid S10 as described in the present invention is obtained.

The experimental data of permeable leakage loss of the drilling fluid is shown in Table 1;

The experimental data of fractured leakage loss of the drilling fluid is shown in Table 2.

Example 11

A drilling fluid is prepared with the method described in the example 1, but The hydrated bentonite, modified nano-silica, hydroxyethyl cellulose, lignite resin, sodium acrylate, and iron ore powder are stirred together at 25° C. temperature at 1,000 rpm stirring speed for 30 min., and then the resultant mixture is kept still for 1 day; that is to say, the scheme of mixing the modified nano-silica with hydrated bentonite first and then mixing the resultant mixture with hydroxyethyl cellulose, lignite resin, sodium acrylate and iron ore powder is not used.

Thus, a drilling fluid S11 as described in the present invention is obtained.

The experimental data of permeable leakage loss of the drilling fluid is shown in Table 1;

The experimental data of fractured leakage loss of the drilling fluid is shown in Table 2.

Comparative Example 1

A drilling fluid is prepared with the method described in the example 1, but the dose of the modified nano-silica is 0.5 g.

Thus, a drilling fluid D1 is obtained.

The experimental data of permeable leakage loss of the drilling fluid is shown in Table 1;

The experimental data of fractured leakage loss of the drilling fluid is shown in Table 2.

Comparative Example 2

A drilling fluid is prepared with the method described in the example 1, but the dose of the modified nano-silica is 80 g.

Thus, a drilling fluid D2 is obtained.

The experimental data of permeable leakage loss of the drilling fluid is shown in Table 1;

The experimental data of fractured leakage loss of the drilling fluid is shown in Table 2.

Comparative Example 3

A drilling fluid is prepared with the method described in the example 1, but the modified nano-silica in the embodiment 1 is replaced with modified nano-silica in 10 nm average particle diameter, and the dose of the modified nano-silica is also 45 g, the same as the dose of the modified nano-silica in the example 1. Thus, a drilling fluid D3 is obtained.

The experimental data of permeable leakage loss of the drilling fluid is shown in Table 1;

The experimental data of fractured leakage loss of the drilling fluid is shown in Table 2.

Comparative Example 4

A drilling fluid is prepared with the method described in the example 1, but the modified nano-silica in the embodiment 1 is replaced with modified nano-silica in 95 nm average particle diameter, and the dose of the modified nano-silica is also 45 g, the same as the dose of the modified nano-silica in the embodiment 1. Thus, a drilling fluid D4 is obtained.

The experimental data of permeable leakage loss of the drilling fluid is shown in Table 1;

The experimental data of fractured leakage loss of the drilling fluid is shown in Table 2.

Comparative Example 5

A drilling fluid is prepared with the method described in the example 1, but the modified nano-silica is not added; instead, a nano-silica product purchased on the market is added. Thus, a drilling fluid D5 is obtained.

The experimental data of permeable leakage loss of the drilling fluid is shown in Table 1;

The experimental data of fractured leakage loss of the drilling fluid is shown in Table 2.

Comparative Example 6

A drilling fluid is prepared with the method described in the example 4, but the dose of the modified nano-silica is 0.5 g. Thus, a drilling fluid D6 is obtained.

The experimental data of permeable leakage loss of the drilling fluid is shown in Table 1;

The experimental data of fractured leakage loss of the drilling fluid is shown in Table 2.

Comparative Example 7

A drilling fluid is prepared with the method described in the example 4, but the dose of the modified nano-silica is 80 g. Thus, a drilling fluid D7 is obtained.

The experimental data of permeable leakage loss of the drilling fluid is shown in Table 1;

The experimental data of fractured leakage loss of the drilling fluid is shown in Table 2.

Test Example 1

This test example is used to evaluate the permeable leakage loss of the drilling fluid.

The testing method is as follows:

30-mesh quartz sand is filled into a tubular instrument to simulate a porous formation, the drilling fluids S1-S11 obtained in the examples 1-11 and the drilling fluids D1-D7 obtained in the comparative examples 1-7 are squeezed into the quartz sand layer by nitrogen pressurization to simulate the condition that a downhole drilling fluid is squeezed into a well wall, and then test is carried out. The results are shown in Table 1.

TABLE 1

| Drilling Fluid | 7.5 min | 30 min |
|---|---|---|
| S1 | Invasion amount: about 9 mL, invasion depth: 0.3 cm | Invasion amount: about 13 mL, invasion depth: 0.7 cm |
| S2 | Invasion amount: about 10 mL, invasion depth: 0.3 cm | Invasion amount: about 14 mL, invasion depth: 0.7 cm |
| S3 | Invasion amount: about 10 mL, invasion depth: 0.3 cm | Invasion amount: about 15 mL, invasion depth: 0.7 cm |
| S4 | Invasion amount: about 11 mL, invasion depth: 0.3 cm | Invasion amount: about 15 mL, invasion depth: 0.7 cm |
| S5 | Invasion amount: about 12 mL, invasion depth: 0.4 cm | Invasion amount: about 15 mL, invasion depth: 0.7 cm |
| S6 | Invasion amount: about 11 mL, invasion depth: 0.3 cm | Invasion amount: about 14 mL, invasion depth: 0.7 cm |
| S7 | Invasion amount: about 14 mL, invasion depth: 0.5 cm | Invasion amount: about 19 mL, invasion depth: 0.9 cm |
| S8 | Invasion amount: about 15 mL, invasion depth: 0.5 cm | Invasion amount: about 19 mL, invasion depth: 0.9 cm |
| S9 | Invasion amount: about 18 mL, invasion depth: 0.6 cm | Invasion amount: about 27 mL, invasion depth: 1.1 cm |
| S10 | Invasion amount: about 18 mL, invasion depth: 0.6 cm | Invasion amount: about 26 mL, invasion depth: 1.1 cm |
| S11 | Invasion amount: about 19 mL, invasion depth: 0.6 cm | Invasion amount: about 28 mL, invasion depth: 1.2 cm |
| D1 | 500 mL is lost fully within 20 s | — |
| D2 | Invasion amount: about 24 mL, invasion depth: 1.8 cm | Invasion amount: about 64 mL, invasion depth: 6 cm |
| D3 | Invasion amount: about 60 mL, invasion depth: 6 cm | All lost |
| D4 | Invasion amount: about 30 mL, invasion depth: 2.2 cm | Invasion amount: about 82 mL, invasion depth: 6.8 cm |
| D5 | All lost | — |
| D6 | All lost | — |
| D7 | Invasion amount: about 53 mL, invasion depth: 5.8 cm | All lost |

It is seen from the evaluation results of permeable leakage loss in Table 1:

In the examples 1-3, the modified nano-silica G1 prepared in the preparation example 1 is used, the components are specific preferred components defined in the present invention, and the doses of the components are within the specific preferred ranges defined in the present invention; therefore, the invasion amounts of the drilling fluids are less than 15 ml, and the invasion depths are smaller than 1 cm. The effect is the best.

In the examples 4-6, the modified nano-silica G2 prepared in the preparation example 2 is used, the components are specific preferred components defined in the present invention, and the doses of the components are within the specific preferred ranges defined in the present invention; therefore, the invasion amounts of the drilling fluids are less than 15 ml, and the invasion depths are smaller than 1 cm. The effect is good; owing to the fact that the amount of the coupler is slightly excessive when the modified nano-silica is prepared in the preparation example 2, the low polymers generated from the excessive silane coupler exert a bridging effect and thereby some particles are agglomerated. Consequently, the particle diameter of the modified nano-silica prepared in the preparation example 2 is greater than that of the modified nano-silica prepared in the preparation example 1. Therefore, the effects of the examples 1-3 are slightly superior to those of the examples 4-6.

In the examples 7-8, the components are specific components defined in the present invention, and the doses of the components are within the specific ranges defined in the present invention; therefore, the invasion amounts of the drilling fluids are less than 20 ml, and the invasion depths are smaller than 1 cm. The effect is relatively good.

In the examples 9-10, the doses of the components are not within the specific ranges defined in the present invention. Therefore, the invasion amounts of the drilling fluids are more than 26 ml, and the invasion depths are greater than 1 cm. The effect is relatively poor.

In the example 11, no modified nano-silica is mixed with hydrated bentonite first; instead, hydrated bentonite, modified nano-silica, hydroxyethyl cellulose, lignite resin, sodium acrylate, and iron ore powder are mixed together. Therefore, the invasion amounts of the drilling fluids are more than 28 ml, and the invasion depths are greater than 1 cm. The effect is relatively poor.

In the comparative example 1, since the dose of the modified nano-silica prepared in the preparation example 1 is too small, no plugging effect is attained. Consequently, all of the drilling fluid D1 is lost;

In the comparative example 2, since the dose of the modified nano-silica prepared in the preparation example 1 is excessive, the density of distribution of the modified nano-silica in the drilling fluid D2 is too high. Consequently, the structure of the drilling fluid is affected adversely, and the invasion amount is too large;

In the comparative example 3, since the modified nano-silica is replaced with modified nano-silica in particle diameter beyond the specific range defined in the present invention (i.e., the particle diameter is two small), the invasion amount of the drilling fluid D3 is too large.

In the comparative example 4, since the modified nano-silica is replaced with modified nano-silica in particle diameter beyond the specific range defined in the present invention (i.e., the particle diameter is two great), the invasion amount of the drilling fluid D4 is too large.

In the comparative example 5, no modified nano-silica is added; instead, nano-silica is added. Consequently, the plugging effect is poor, and all of the drilling fluid D5 is lost.

In the comparative example 6, since the dose of the modified nano-silica prepared in the preparation example 2 is too small, no plugging effect is attained. Consequently, all of the drilling fluid D6 is lost.

In the comparative example 7, since the dose of the modified nano-silica prepared in the preparation example 2 is excessive, the density of distribution of the modified nano-silica in the drilling fluid D7 is too high. Consequently, the structure of the drilling fluid is affected adversely, and the invasion amount is too large.

Test Example 2

The test example 2 is used to evaluate the fractured leakage loss of the drilling fluid.

The testing method is as follows:

A specially designed steel column with two parallel slits in the middle part is used in the experiment to simulate fractures in the formation, and the slit width may be adjusted as required according to the actual situation in the field. The influences of the drilling fluids S1-S11 in the examples 1-11 and the drilling fluids D1-D7 in the comparative examples 1-7 on the bearing capacity of the formation are evaluated by adjusting nitrogen input pressure.

The results are shown in Table 2.

TABLE 2

| Leakage Loss (mL) | Pressure (MPa) | | | | | | |
|---|---|---|---|---|---|---|---|
| | 0 | 1 | 2 | 3 | 4 | 5 | 6 |
| S1 | 0 | 1 | 1 | 1 | 0 | 0 | 0 |
| S2 | 0 | 2 | 1 | 0 | 0 | 0 | 0 |
| S3 | 0 | 3 | 1 | 2 | 1 | 0 | 0 |
| S4 | 1 | 4 | 0 | 2 | 2 | 1 | 0 |
| S5 | 0 | 3 | 2 | 2 | 2 | 2 | 1 |

TABLE 2-continued

| Leakage Loss (mL) | Pressure (MPa) | | | | | | |
|---|---|---|---|---|---|---|---|
| | 0 | 1 | 2 | 3 | 4 | 5 | 6 |
| S6 | 0 | 5 | 3 | 2 | 1 | 1 | 0 |
| S7 | 2 | 5 | 4 | 3 | 3 | 2 | 0 |
| S8 | 2 | 4 | 4 | 3 | 2 | 2 | 1 |
| S9 | 2 | 5 | 5 | 4 | 4 | 2 | 2 |
| S10 | 3 | 6 | 4 | 4 | 4 | 4 | 3 |
| S11 | 2 | 6 | 6 | 4 | 4 | 3 | 2 |
| D1 | 300 | All lost | — | — | — | — | — |
| D2 | 200 | 150 | All lost | — | — | — | — |
| D3 | 180 | 142 | 90 | All lost | — | — | — |
| D4 | 240 | 150 | All lost | — | — | — | — |
| D5 | All lost | — | — | — | — | — | — |
| D6 | All lost | — | — | — | — | — | — |
| D7 | 150 | 95 | 60 | All lost | — | — | — |

It is seen from the experimental data of fractured leakage loss in the Table 2:

In the examples 1-3, the modified nano-silica G1 prepared in the comparative example 1 is used, the components are specific preferred components defined in the present invention, and the doses of the components are within the specific preferred ranges defined in the present invention; therefore, the total leakage loss values of the drilling fluids are lower than 10 ml.

In the examples 4-6, the modified nano-silica G2 prepared in the preparation example 2 is used, the components are specific preferred components defined in the present invention, and the doses of the components are within the specific preferred ranges defined in the present invention; therefore, the total leakage loss values of the drilling fluids are lower than 12 ml.

In the examples 7-8, the components are specific components defined in the present invention, and the doses of the components are within the specific ranges defined in the present invention; therefore, the total leakage loss values of the drilling fluids are lower than 20 ml, and the effect is relatively good.

In the examples 9-10, the doses of the components are not within the specific ranges defined in the present invention; therefore, the total leakage loss values of the drilling fluids are higher than 20 ml, and the effect is poor.

In the example 11, no modified nano-silica is mixed with hydrated bentonite first; instead, hydrated bentonite, modified nano-silica, hydroxyethyl cellulose, lignite resin, sodium acrylate, and iron ore powder are mixed together. Therefore, the total leakage loss of the drilling fluid is more than 25 ml, and the effect is poor.

In the comparative example 1, since the dose of the modified nano-silica prepared in the preparation example 1 is too small, the leakage loss is increased.

In the comparative example 2, since the dose of the modified nano-silica prepared in the preparation example 1 is excessive, the leakage loss is increased.

In the comparative example 3, since the modified nano-silica is replaced with modified nano-silica in particle diameter beyond the specific range defined in the present invention (i.e., the particle diameter is two small), the leakage loss is increased.

In the comparative example 4, since the modified nano-silica is replaced with modified nano-silica in particle diameter beyond the specific range defined in the present invention (i.e., the particle diameter is two great), the leakage loss is increased.

In the comparative example 5, no modified nano-silica is added; instead, nano-silica is added; consequently, the leakage loss is increased.

In the comparative example 6, since the dose of the modified nano-silica prepared in the preparation example 2 is too small, the leakage loss is increased.

In the comparative example 7, since the dose of the modified nano-silica prepared in the preparation example 2 is excessive, the leakage loss is increased.

Therefore, the drilling fluid provided in the present invention employs modified nano-silica to improve dispersity and particle size distribution in the drilling fluid. Therefore, the drilling fluid is especially suitable for well drilling in shale formations with developed micro-fractures (micro-fissures) and micro-pores, low porosity and low permeability ($10^{-3}$-$10^{-7}$ md), and prominent capillary effect; in addition, since the components of the drilling fluid prepared in the present invention and the contents of the components are within the ranges defined in the present invention, the obtained drilling fluid has outstanding plugging performance, can greatly decrease the probability of occurrence of severe leakage loss in the drilling process, and thereby significantly reduces the construction cost.

While the present invention is described above in detail in some preferred embodiments, the present invention is not limited to those embodiments. Different simple variations can be made to the technical scheme of the present invention within the scope of the technical concept of the present invention, including combining the specific technical features in any proper way. Various possible combinations are not described in the present invention, in order to avoid unnecessary repetitive description. However, such simple variations and combinations shall also be deemed as having been disclosed and falling in the scope of protection of the present invention.

The invention claimed is:

1. A strong plugging drilling fluid suitable for shale gas wells, the strong plugging drilling fluid consisting of:
   water,
   bentonite,
   a tackifier,
   a flow pattern regulator,
   a filtrate reducer,
   a plugging agent, and
   a weighting agent,
   wherein, based on 100 parts by weight of water, the content of the bentonite is 1-10 parts by weight, the content of the tackifier is 5-15 parts by weight, the content of the flow pattern regulator is 4-13 parts by weight, the content of the filtrate reducer is 4-13 parts by weight, the content of the plugging agent is 20-55 parts by weight, and the content of the weighting agent is 10-60 parts by weight;
   wherein the plugging agent is modified nano-silica, the modified nano-silica is in a primary mono-dispersed structure and the particle diameter of the modified nano-silica is 25-70 nm; and
   wherein the tackifier is hydroxyethyl cellulose; the flow pattern regulator is sodium acrylate; the filtrate reducer is lignite resin; and the weighting agent is iron ore powder.

2. The strong plugging drilling fluid according to claim 1, wherein, based on 100 parts by weight of water, the content of the bentonite is 5-7 parts by weight, the content of the tackifier is 9-11 parts by weight, the content of the flow pattern regulator is 9-11 parts by weight, the content of the filtrate reducer is 9-11 parts by weight, the content of the plugging agent is 44-46 parts by weight, and the content of the weighting agent is 35-45 parts by weight.

3. The strong plugging chilling fluid according to claim 1, wherein the pH of the drilling fluid is 8-10.

4. The strong plugging drilling fluid according to claim 1, wherein the density of the drilling fluid is 1.1-1.8 g/cm$^3$.

5. The strong plugging drilling fluid according to claim 4, wherein the density of the drilling fluid is 1.3-1.5 g/cm$^3$.

6. A method for preparing the drilling fluid suitable for shale gas wells according to claim 1, comprising the following steps:
 (1) prehydrating bentonite;
 (2) mixing the prehydrated bentonite obtained in the step (1) with modified nano-silica;
 (3) mixing the mixture obtained in the step (2) with a tackifier, a flow pattern regulator, a filtrate reducer, and a weighting agent.

\* \* \* \* \*